United States Patent
Hayashi

(10) Patent No.: US 6,252,864 B1
(45) Date of Patent: Jun. 26, 2001

(54) CDMA COMMUNICATION APPARATUS AND CDMA COMMUNICATION METHOD

(75) Inventor: Masaki Hayashi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/058,884

(22) Filed: Apr. 13, 1998

(30) Foreign Application Priority Data

May 29, 1997 (JP) .................................... 9-140507

(51) Int. Cl.[7] .................................... H04B 7/216
(52) U.S. Cl. .................... 370/335; 370/334; 370/342; 375/200
(58) Field of Search ................... 370/334, 320, 370/335, 342, 979; 375/267, 299, 200, 130; 455/101

(56) References Cited

U.S. PATENT DOCUMENTS

| | | | |
|---|---|---|---|
| 5,598,404 | * 1/1997 | Hayashi | 370/342 |
| 5,652,764 | * 7/1997 | Kanzaki | 375/200 |
| 5,856,971 | * 1/1999 | Gitlin et al. | 370/342 |
| 5,886,987 | * 3/1999 | Yoshida et al. | 370/318 |
| 5,926,471 | * 1/1999 | Shoji | 370/342 |
| 5,952,963 | * 9/1999 | Shen et al. | 342/367 |
| 6,002,672 | * 12/1999 | Todd | 370/252 |
| 6,014,570 | * 1/2000 | Wong et al. | 455/500 |

FOREIGN PATENT DOCUMENTS

| | | |
|---|---|---|
| 0668668 | 8/1995 | (EP) . |
| 0755127 | 1/1997 | (EP) . |
| 2297224 | 7/1996 | (GB) . |
| 9-102768 | 4/1997 | (JP) . |

OTHER PUBLICATIONS

Copy of an English Languange Abstract of JP No. 9–102768.

* cited by examiner

Primary Examiner—Douglas Olms
Assistant Examiner—Ken Vanderpuye
(74) Attorney, Agent, or Firm—Greenblum & Bernstein P.L.C.

(57) ABSTRACT

At base station 101, information signals for mobile station (1) are distributed, each spread with a different spreading code then transmitted from two antennas (3) and (4) assumed under good condition in radio propagation. In mobile station (1), composed waves of both signals are received and each is despread with respective spreading code, as well as in mobile station (2). According to it, it is possible to transmit the same information from a plurality of different antennas at the same time, which prevents the deterioration in communication quality in the case where a wrong antenna is selected or the radio propagation condition varies fast.

27 Claims, 8 Drawing Sheets

CDMA COMMUNICATION APPARATUS AND CDMA COMMUNICATION METHOD

BACKGROUND OF THE INVENETION

1. Field of the Invention

The present invention relates to a communication apparatus and a communication method using CDMA (Code Division Multiple Access).

2. Description of the Related Art

FIG. 1 illustrates a conventional mobile communication apparatus for executing base station transmission diversity using CDMA. In FIG. 1, a base station has four base station antennas and is concurrently communicating with three mobile stations in a cell. In other words, base station 1 has four antennas (1) through (4), 2 through 5, and three mobile stations 6 through 8 in communicating with base station 1 exist in a cell. Base station 1 executes transmission diversity by switching four transmission antennas (1) through (4).

In a radio communication, propagation conditions of radio signals vary largely depending on transition of a mobile station or a surroundings material. If there are enough spaces between four antennas (1) through (4), each propagation condition of radio signals of mobile station (1) with each of four antennas (1) through (4) varies independently. In mobile station (2) and (3), the conditions are also in the same way.

In a TDD (Time Division Duplex) system for communicating alternatively in forward link and reverse link at certain intervals in the same radio frequency band, high similarity is maintained in radio propagation conditions, which allows to easily assume the propagation condition of reverse link from the propagation condition of reverse link.

At a certain time, at a base station, after comparing the radio propagation conditions of mobile station (1) with base station antennas (1) through (4), in the case where the propagation condition of radio signals with antenna (3) is assumed to be the best, information signals for mobile station (1) are transmitted from antenna (3). Similarly, in the case where the propagation condition of radio signals with antenna (3) at mobile station (2) is assumed to be the best, information signals for mobile station (2) are transmitted from antenna (3), and in the case where the propagation condition of radio signals with antenna (2) at mobile station (3) is assumed to be the best, information signals for mobile station (3) are transmitted from antenna (2).

In this way, since information signals for each mobile station are transmitted from an antenna with the best condition in radio propagation, it is possible to improve radio communication quality and increase the number of mobile stations capable of concurrently communicating with a base station at the same quality level.

However, in a conventional mobile communication apparatus for executing base station transmission diversity described above, since one base station transmission antenna is selected, in the case where a wrong transmission antenna is selected or the propagation condition of radio signals varies faster than a selection period of transmission antenna, it may occur that information signals are not transmitted from an antenna under good propagation condition, which results in deterioration of communication quality. And, since same spread signals are transmitted from a plurality of antennas at the same time, interference in the signals causes the different propagation condition between transmission and reception, which brings the problem that an antenna in good propagation condition is not selected for transmission.

SUMMARY OF THE INVENTION

The purpose of the present invention is to provide an excellent CDMA communication apparatus and CDMA communication method which reduce deterioration in communication quality in the case where a wrong antenna is selected or channel conditions vary fast.

The above purpose is achieved by a CDMA communication apparatus and CDMA communication method in which each of a plurality of different spreading codes is assigned for each communication line and a plurality of antennas each transmits signals spread with the different spreading code. By the CDMA communication apparatus and CDMA communication method, deterioration in communication quality in the case where a wrong antenna is selected or channel conditions vary fast is reduced.

DETAILED DESCRIPTION OF THE PREFERRED EMBODIMENT

Figure 1:
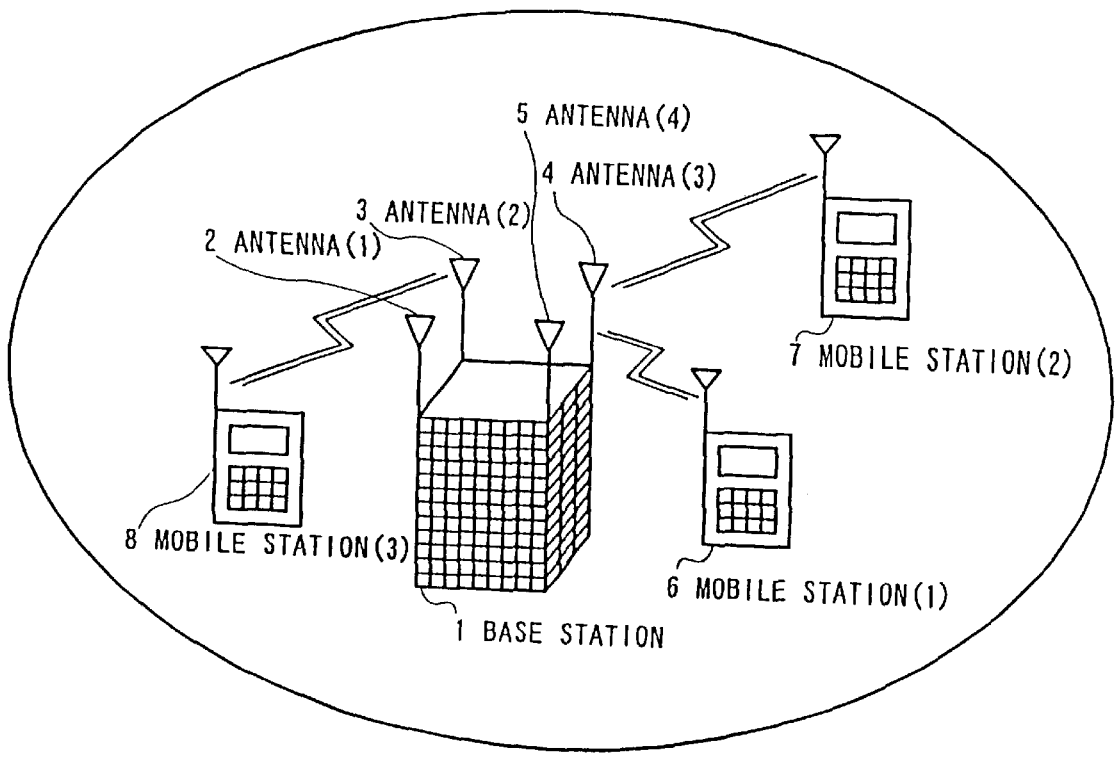
FIG. 1 is a model diagram to explain conventional base station transmission diversity.

The present invention provides a transmission apparatus includes a plurality of transmission and reception common antennas, a section for selecting in some lines at least two antennas under good channel condition from the transmission and reception common antennas, a section for assigning a different spreading code for each of the lines and for spreading information signals of each communication line with the different spreading code, a section for connecting each of the spreading signals for each of the lines or channels to the selected transmission and reception common antenna by switching, and a section coupled to each of the transmission and reception common antennas for composing spread signals, wherein the apparatus connects a plurality of lines or channels using CDMA. As described above, by spreading information of one line with a plurality of different spreading codes, it makes possible to transmit each spread information signals from a different antenna at the same time.

And, the present invention provides a reception apparatus for CDMA includes a section for despreading reception signals with a plurality of different spreading codes, a section for acquiring a synchronization of a spreading code from the despread signals and a section for composing the despread signals. As descried above, original information signals can be composed by despreaing information signals spread with different spreading codes then transmitted from different antennas at the same time.

And The present invention provides a transmission apparatus includes a plurality of transmission and reception common antennas, a section for selecting in some lines at least two antennas under good channel condition from the transmission and reception common antennas, a section for assigning a different spreading code for each of the lines and for spreading information signals of each communication line with the different spreading code, a section for assigning a different spreading code for each of some transmission and reception common antennas and for spreading a pilot signal corresponding to each antenna, a section for connecting each of the spread signals for each of the lines to the selected transmission and reception common antenna by switching, and a section coupled to each of the transmission and reception common antennas for composing spread signals of information signals and a pilot signal, wherein the apparatus connects a plurality of lines using CDMA. In this way, it is possible to spread information of one line with a plurality of different spreading codes and to transmit each spread signal from a separate antenna at the same time.

And, the present invention provides a reception apparatus for CDMA includes a section for despreading reception signals with a different spreading code assigned for a pilot signal and another different spreading code assigned for information signals, a section for acquiring a synchronization of a spreading code from the despread signal of the pilot signal and despread signals of information signals, and a section for composing the despread signals of information signals by correcting using the despread signal of the pilot signal. As descried above, original information signals can be composed by despreaing information signals spread with different spreading codes then transmitted from different antennas at the same time.

The Embodiments of the present invention are explained in details with reference to attached drawings in the following.

(Embodiment 1)

Figure 2:
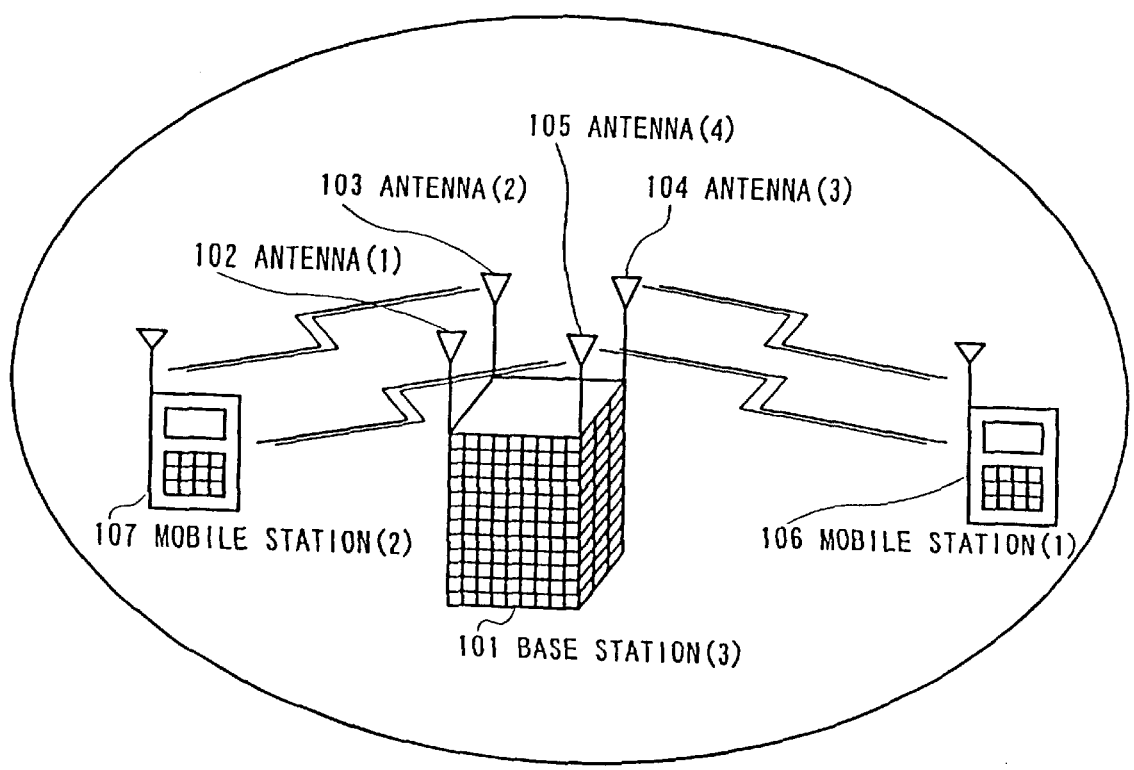
FIG. 2 is a model diagram to explain base station transmission diversity in the Embodiment of the present invention.

FIG. 2 is a model diagram to explain base station transmission diversity. This figure illustrates the case where a base station has four antennas and is concurrently communicating with two mobile stations in a cell transmitting information signals to the mobile stations using two antennas for each mobile station. The case is the same as in the following Embodiments.

Base station 101 having four antennas (1) through (4) 102 through 105 is communicating with two mobile stations (1) and (2) 106 and 107. And base station 101 executes transmission diversity by switching transmission antenna (1) through (4).

At a certain time, after comparing the radio propagation conditions of mobile station (1) with base station antennas (1) through (4), in the case where the propagation conditions of radio signals with antennas (3) and (4) are assumed to be relatively good, information signals for mobile station (1) are transmitted from antennas (3) and (4). At this time, information signals transmitted from antenna (3) are spread with spreading code S1 and information signals transmitted from antenna (4) are spread with spreading code S2 differing from spreading code S1.

According to it, information signals transmitted from antenna (3) and information signals transmitted from antenna (4) are signals having the same information with different signal waves. Accordingly, in the case of transmitting both signals at the same time, the signals have the correlation with delayed versions in spreading codes but do not affect fading states of radio signals from another antenna.

Similarly, in mobile station (2), in the case where the propagation conditions of radio signals with antennas (2) and (3) are assumed to be relatively good, information signals for mobile station (2) are transmitted from antennas (2) and (3). At this time, information signals transmitted from antenna (2) are spread with spreading code S3 and information signals transmitted from antenna (3) are spread with spreading code S4 differing from spreading code S3.

Figure 3:
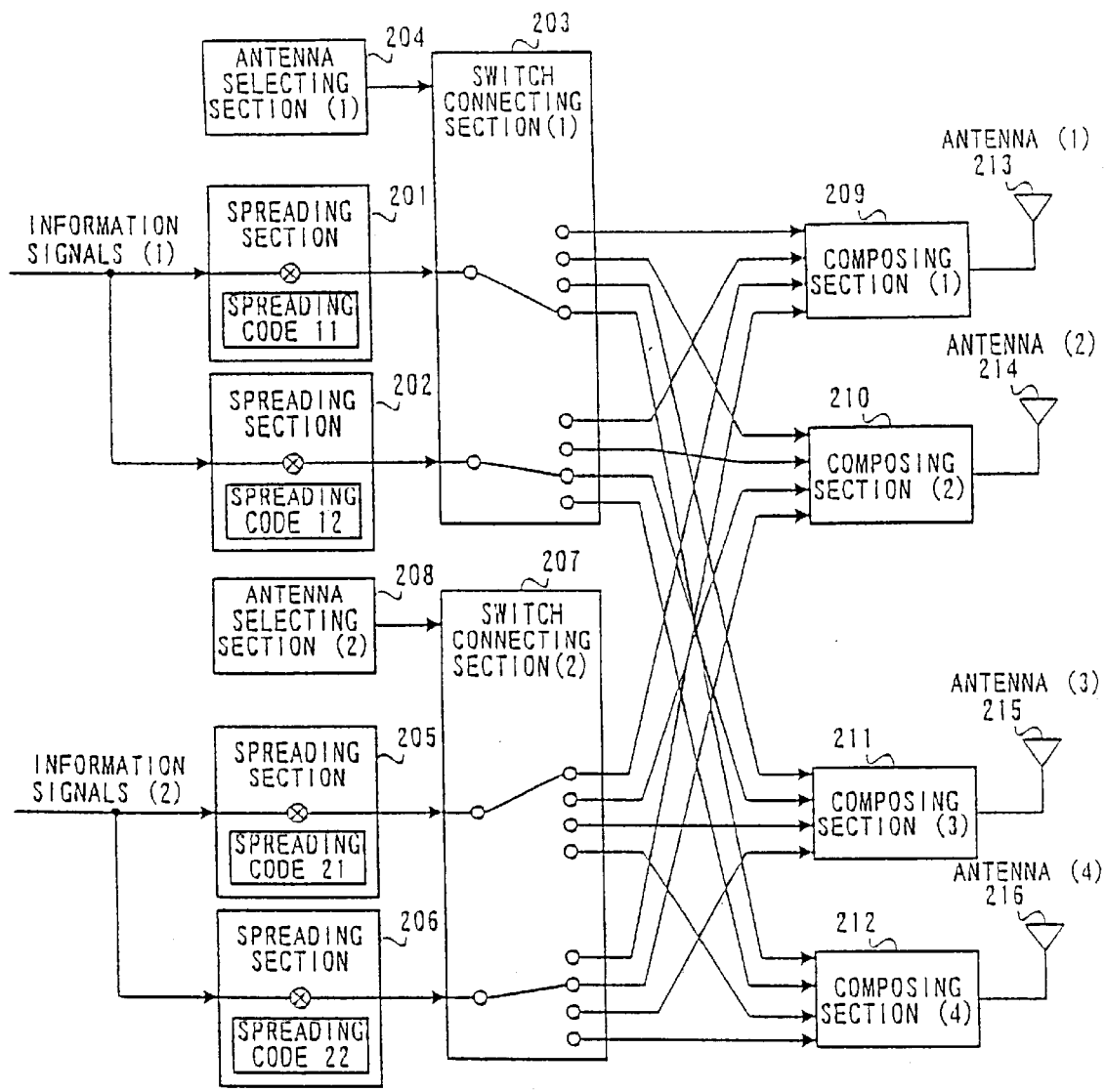
FIG. 3 is a block diagram illustrating configuration of a base station transmission apparatus in the Embodiment 1 of the present invention.

FIG. 3 is a block diagram illustrating a base station transmission apparatus in the case illustrated in FIG. 2. The base station transmission apparatus comprises a processing section for mobile station (1) and another processing section for mobile station (2). The processing section for mobile station (1) comprises spreading sections 201 and 202 for spreading information signals (1) with different spreading codes 11 and 12 respectively and switching section (1) 203 for switching spread signals on the basis of a selection result of antenna selecting section (1) 204. And, the processing section for mobile station (2) comprises spreading sections 205 and 206 for spreading information signals (2) with different spreading codes 21 and 22 respectively and switching section (2) 207 for switching spread signals on the basis of a selection result of antenna selecting section (2) 208. And the base station transmission apparatus comprises composing sections 209 through 212 for composing signals transmitted through connecting sections 203 and 207. Further, these composing sections 209 through 212 are coupled to antennas 213 through 216 respectively.

Next, operations of the base station transmission apparatus constituted as described above are explained. Different spreading codes 11, 12, 21 and 22 are assigned for spreading sections 201, 202, 205 and 206 respectively as mentioned previously.

Information signals (1) for mobile station (1) are distributed to spreading sections 201 and 202. Spreading section 201 spreads information signals (1) with spreading code 11 to transmit into switching section 203. Spreading section 202 spreads information signals (1) with spreading code 12 to transmit into switching section 203. Antenna selecting section 204 selects two antennas assumed under good condition in radio propagation with mobile station (1) and instructs them to switching section 203. Switching section 203 connects each of spreading sections 201 and 202 with each of composing sections 209 through 212 coupled to an antenna selected according to the instruction from antenna selecting section 204. In this way, antennas assumed under good conditions in radio propagation with mobile station (1) are allowed to transmit two information signals spread with different spreading codes.

As a method to assume an antenna under good condition in radio propagation, a method using reception level is known, for instance, a method to select an antenna with large correlation or large SIR of despread signals.

And, another method is to monitor correlation and SIR then assume from obtained previous information on them. For instance, in the case where the reception level of antenna A is decreasing gradually and the reception level of antenna B is increasing gradually, it is assumed that the next level of antenna B is bigger than that of A, then antenna B is decided as an antenna under good condition in radio propagation.

Information signals (2) for mobile station (2) are distributed to spreading section 205 and spreading section 206. Spreading section 205 spreads information signals (2) with spreading code 21 to transmit to switching section 207. Spreading section 206 spreads information signals (2) with spreading code 22 to transmit to switching section 207. Antenna selecting section 208 selects two antennas assumed under good condition in radio propagation with mobile station (2) and instructs them to switching section 207. Switching section 207 assigns signals for two of composing sections 209 through 212 coupled to an antenna selected according to the instruction from antenna selecting section 208. In this way, antennas assumed under good condition in radio propagation with mobile station (2) are allowed to transmit two information signals spread with different spreading codes.

Composing section 209 composes spread signals to output into antenna (1) 213. Composed signals is frequency converted into radio frequency to be transmitted through antenna (1). Similarly, composing sections 210, 211 and 214 compose spread signals to output into antennas (2) through (4) 214 through 216 respectively, and composed signals is frequency converted into radio frequency to be transmitted through antennas (2) through (4).

According to it, information signals for each mobile station are transmitted from two antennas assumed under good conditions in radio propagation. Because of it, in the case of selecting one wrong antenna by error in assuming, the probability that the selected two antennas are wrong at the same time is small. That permits to accurately select an antenna under good condition in radio propagation, which improves communication performance.

And, in the case where the condition in radio propagation varies relatively fast compared with a selection period for antenna, the propagation condition for one transmission antenna may deteriorate, however the probability that the propagation conditions for both transmission antennas deteriorate at the same time is small. That permits to accurately select an antenna under good condition in radio propagation, which improves communication performance.

And, a plurality of signals having the same information are transmitted from a plurality of antennas, however the signal waves are different each other because each transmitted signals are spread with a different spreading code. Accordingly, the signals have the correlation with delayed versions in spreading codes but do not affect other propagation conditions, which results in no changes in propagation conditions in receiving and transmitting.

As described above, in the Embodiment 1, by distributing information signals, spreading each of them with each of a plurality of different spreading codes then transmitting it from a different antenna, it is possible to improve communication quality in radio lines and to increase the number of mobile stations capable of communicating with one base station. That brings the high utilization efficiency of radio frequency under limitations.

And, in the Embodiment described above, application for a base station is explained, however this CDMA transmission apparatus is also applicable for a mobile station. And, in the Embodiment described above, the case of transmitting at the same power level from selected two antennas is explained, however, in the present invention, it is possible to transmit at different power levels corresponding to reception power and the like from selected two antennas.

(Embodiment 2)

Figure 4:
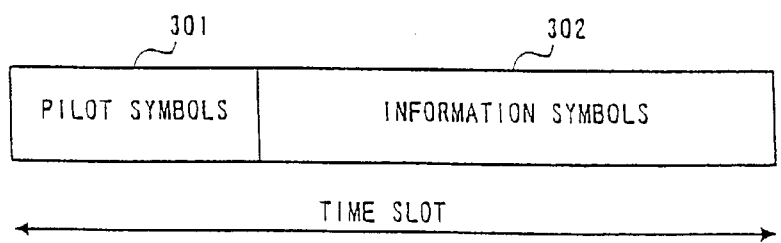
FIG. 4 is a frame configuration diagram of transmission frame in the Embodiments 1 and 2 of the present invention.

Next, the Embodiment 2 of the present invention is explained. FIG. 4 illustrates a frame configuration diagram of transmission frame. In a time slot, pilot symbols 301 and information symbols 302 are included. Pilot symbols 301, which are well known at reception side, are to detect a standard phase to assume and compensate a phase shift at reception side. Information symbols 302 include information on coded user voice and information on line control. As information symbols, error correction coded information symbols can be used.

Figure 5:
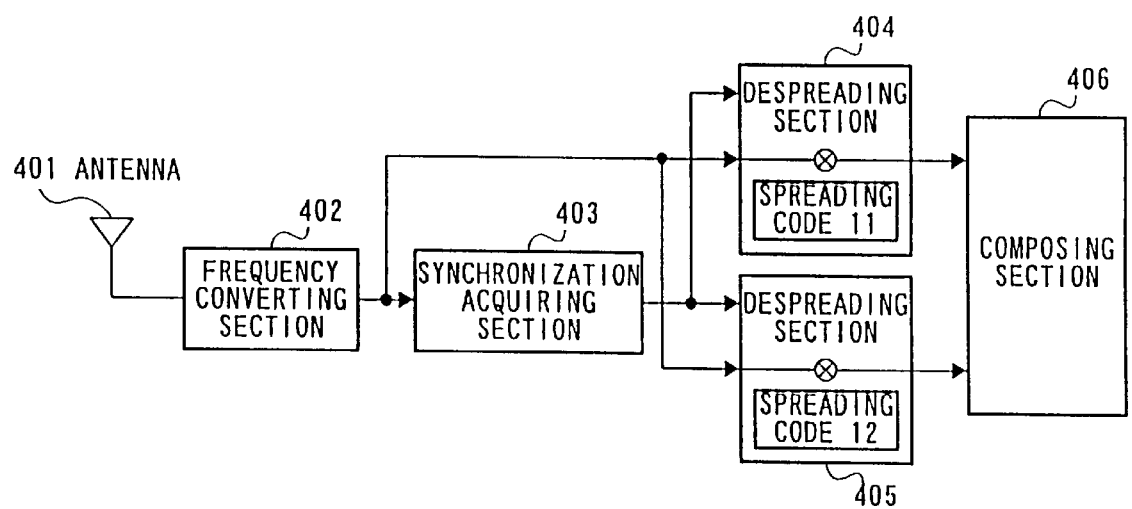
FIG. 5 is a block diagram illustrating configuration of a mobile station reception apparatus in the Embodiment 2 of the present invention.

The case is considered where the signals in the frame configuration described above are transmitted from the base station apparatus in the Embodiment 1 and they are received at the mobile station reception apparatus having the constitution illustrated in FIG. 5. FIG. 5 illustrates the case of two spreading sections at the reception apparatus. The reception apparatus frequency converts signals received at antenna 401 at frequency converting section 402, acquires a synchronization using reception signals at synchronization acquiring section 403, despread signals at despreading sections 404 and 405 using spreading codes and composed the signals at composing section 406.

Operations at the mobile station reception apparatus constituted described above are explained. Radio signals are received at antenna 401 and transmitted into frequency converting section 402. Signals frequency converted from radio frequency are distributed to provide into synchronization acquiring section 403 and deapreading sections 404 and 405. Synchronization acquiring section 403 acquires a synchronization. The acquisition is executed on the basis of correlation obtained by despreading reception signals. Despreading sections 404 and 405 despread reception signals with spreading codes 11 and 12 respectively to obtain desired signal components. In this case, it is allowed to use both spreading codes or either of them.

Because signals transmitted from two antennas at a base station at the same time are received at almost same time, the timing acquired using spreading code 11 and the timing acquired using spreading code 12 are almost same. By using both timings, it is possible to reduce a time to acquire the timing, and to acquire the timing accurately.

The acquired timing is provided into despreading sections 404 and 405. Despreading section 404 despreads reception signals with spreading code 11, assumes a phase shift amount from pilot symbols and compensates the phase shift amount of information symbols on the basis of the assumed phase shift amount to provide into composing section 406. Despreading section 405 despreads reception signals with spreading code 12, assumes a phase shift amount from pilot symbols and compensates the phase shift of information symbols on the basis of the assumed phase shift amount to provide into composing section 406. Composing section 406 composes signals despread at despreading sections 404 and 405 to reproduce information signals.

According to it, information signals transmitted from two base station assumed under good condition in radio propagation can be received at the same time. Because of it, in the case where either of antennas selected at a base station is wrong because of an error in assuming, signals transmitted from another antenna can be received. And, in the case where reception condition of signals from one antenna deteriorates when radio propagation condition vary relatively fast compared to a selection period of antenna, better signals from another antenna can be received. That allows high quality communication.

As described above, in the Embodiment 2, by despreading information signals, which are distributed, spread with each of a plurality of spreading codes then transmitted from each of different antennas, with the spreading code used in spreading to compose, high utilization efficiency of radio frequency under limitations is achieved with communication quality in radio lines improved and the number of mobile stations capable of communicating with one base station increased.

And, in the Embodiment described above, application for a mobile station is explained, however this CDMA transmission apparatus is also applicable for a base station.

(Embodiment 3)

Figure 6:
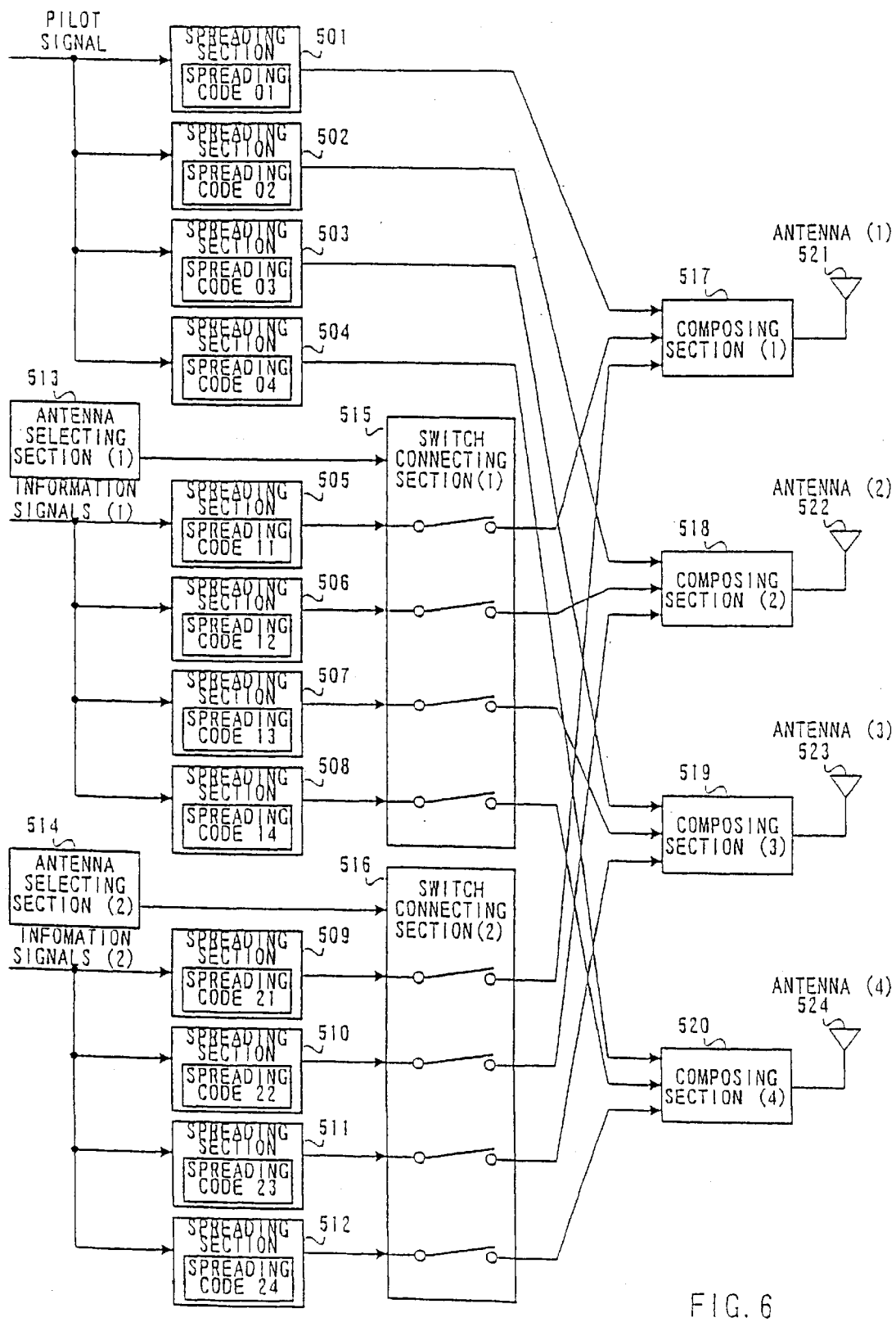
FIG. 6 is a block diagram illustrating configuration of a base station transmission apparatus in the Embodiment 3 of the present invention.

Next, the Embodiment 3 of the present invention is explained. FIG. 6 illustrates a block diagram of a base station transmission apparatus in the Embodiment 3. The base station transmission apparatus comprises a processing section for processing a pilot signal, a processing section for mobile station (1) and a processing section for mobile station (2). The processing section for processing a pilot signal comprises spreading sections 501 through 504 for spreading a pilot signal with different spreading codes 01, 02, 03 and 04. The processing section for mobile station (1) comprises spreading sections 505 through 508 for spreading information signals (1) with different spreading codes 11, 12, 13 and 14 and switching section (1) 515 for switching spread signals on the basis of a selection result at antenna selecting section (1) 513. And, the processing section for mobile station (2) comprises spreading sections 509 through 512 for spreading information signals (2) with different spreading codes 21, 22, 23 and 24 and switching section (2) 516 for switching spread signals on the basis of a selection result at antenna selecting section (2) 514. And, the base station transmission apparatus comprises composing sections 517 through 520 for composing signals transmitted after switched at switching sections 515 and 516. Further, these comprises composing sections 517 through 520 are coupled to antennas 521 through 524 respectively.

Next, operations at the base station transmission apparatus constituted as described above are explained. Different spreading codes 01 through 04, 11 through 14 and 21 through 24 are assigned for spreading sections 501 through 512 as described above.

A pilot signal is distributed to provide into spreading sections 501 through 504. Spreading section 501 spreads the pilot signal with spreading code 01 to provide into composing section 517. Spreading section 502 spreads the pilot signal with spreading code 02 to provide into composing section 518. Spreading section 503 spreads the pilot signal with spreading code 03 to provide into composing section 519. Spreading section 504 spreads the pilot signal with spreading code 04 to provide into composing section 520.

Information signals (1) for mobile station (1) are distributed to provide into spreading sections 505 through 508. Spreading section 505 spreads information signals (1) with spreading code 11 to provide into switching section 515. Spreading section 506 spreads information signals (1) with spreading code 12 to provide into switching section 515. Spreading section 507 spreads information signals (1) with spreading code 13 to provide into switching section 515. Spreading section 508 spreads information signals (1) with spreading code 14 to provide into switching section 515.

Antenna selecting section 513 selects two antennas assumed under good condition in radio propagation with mobile station (1) to instruct to switching section 515. According to the instruction from antenna selecting section 513, switching section 515 assigns each of different two spread information signals to respective composing section. Similarly, information signals (2) for mobile station (2) are distributed to provide into spreading sections 509 through 512. In addition, a method to assume antennas under good condition in radio propagation is the same as that of Embodiment 1.

Spreading section 509 spreads information signals (2) with spreading code 21 to provide into switching section 516. Spreading section 510 spreads information signals (2) with spreading code 22 to provide into switching section 516. Spreading section 511 spreads information signals (2) with spreading code 23 to provide into switching section 516. Spreading section 512 spreads information signals (2) with spreading code 24 to provide into switching section 516.

Antenna selecting section 514 selects two antennas assumed under good condition in radio propagation with mobile station (2) to instruct to switching section 516. According to the instruction from antenna selecting section 514, switching section 516 assigns different two spread information signals to respective composing sections 517 through 520. Composing section 517 composes spread signals of the pilot signal and spread signals of information signals to output into antenna 521. In a similar way, composing sections 518 through 520 compose spread signals of the pilot signal and spread signals of information signals respectively to respectively output into antennas 522 through 524. Antennas 521 through 524 convert the frequency of respective composed signals into radio frequency.

According to it, information signals for each mobile station are transmitted from two antennas assumed under good condition in radio propagation. Because of it, in the case of selecting one wrong antenna by error in assuming, the probability that the selected two antennas are wrong at the same time is small. That permits to accurately select an antenna under good condition in radio propagation, which improves communication performance.

And, in the case where the condition in radio propagation varies relatively fast compared with a period for antenna selection, the propagation condition for one transmission antenna may deteriorate, however the probability that the propagation conditions for both transmission antennas deteriorate at the same time is small. That permits to accurately select an antenna under good condition in radio propagation, which improves communication performance.

And, a plurality of information signals having the same information are transmitted from a plurality of antennas, however the signal waves are different each other because each transmitted signals are spread with a different spreading code. Accordingly, the signals have the correlation with delayed versions in spreading codes but do not affect other propagation condition, which results in no changes in propagation conditions in receiving and transmitting.

And, by using a common pilot signal for each antenna, it is possible to increase the number of pilot symbols in a frame, which results in making the reliability in communication higher. It is also possible to decrease the ratio of pilot signal in total signals, which results in a increase of the ratio of information signals.

As described above, in the Embodiment 3 of the present invention, by distributing information signals, spreading each of them with each of a plurality of different spreading codes then transmitting it from a different antenna, high utilization efficiency of radio frequency under limitations is achieved with communication quality in radio lines improved and the number of mobile stations capable of communicating with one base station increased.

And, in the Embodiment described above, application for abase station is explained, however this CDMA transmission apparatus is also applicable for a mobile station. And, in the Embodiment described above, the case of transmitting at the same power level from selected two antennas is explained, however, in the present invention, it is possible to transmit at different power levels corresponding to reception power levels and the like from selected two antennas.

(Embodiment 4)

Figure 7:
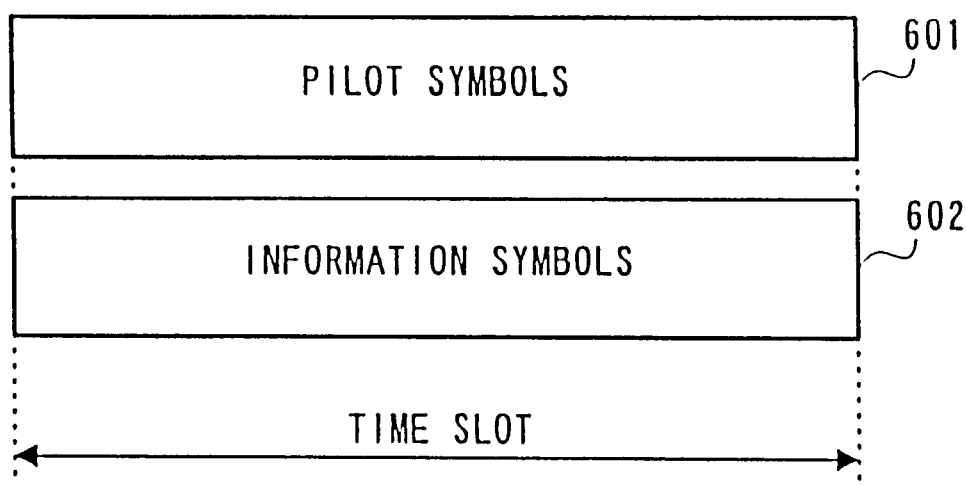
FIG. 7 is a frame configuration diagram of transmission frame in the Embodiments 3 and 4 of the present invention.

Next, the Embodiment 4 of the present invention is explained. FIG. 7 is a frame diagram illustrating a configuration of transmission frames. Pilot symbols 601, which are well known at reception side, are to detect a standard phase to assume and compensate a phase shift at reception side. Information symbols 602 include information on coded user voice and information on line control. As information symbols, error correction coded information symbols can be used. In the Embodiment, the case where pilot symbols 601 and information symbols 602 have the same time slot length is explained.

Figure 8:
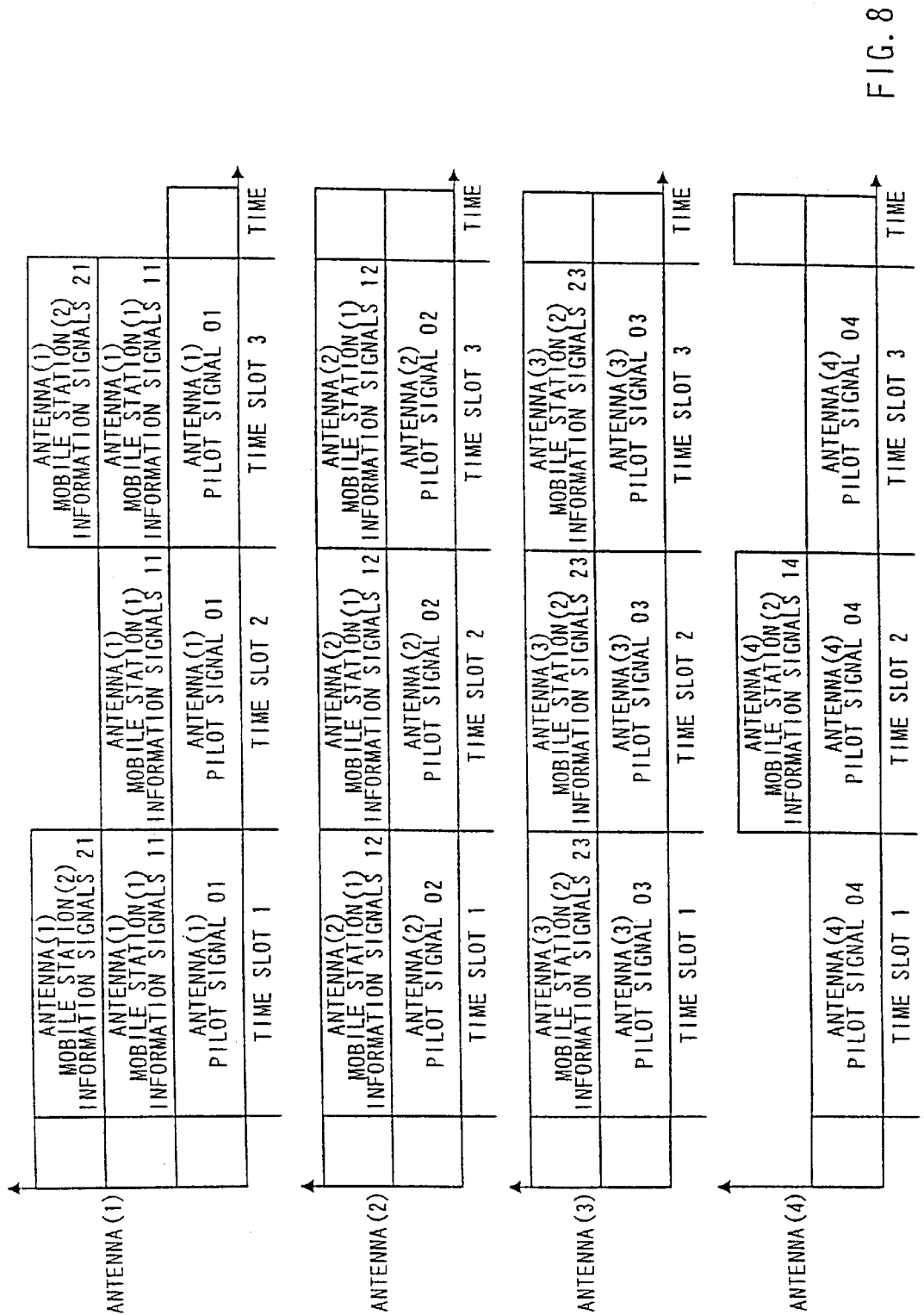
FIG. 8 is a signal configuration diagram of transmission signals in the Embodiments 3 and 4 of the present invention.

FIG. 8 illustrates model diagrams of signals transmitted from each antenna. The horizontal line indicates time. The vertical line indicates a type of spread signals to compose. For antenna 1, in time slot 1, spread pilot signal 01 for antenna 1, spread information signals 11 for mobile station (1) and spread information signals 21 for mobile station (2) are composed to transmit. In time slot 2, spread pilot signal 01 for antenna 1 and spread information signals 11 for mobile station (1) are composed to transmit. For antenna 2, in time slots 1 through 3, spread pilot signal 02 for antenna 2 and spread information signals 12 for mobile station (1) are composed to transmit. For antenna (3), in time slots 1 through 3, spread pilot signal 03 for antenna (3) and spread information signals 23 for mobile station (2) are composed to transmit. For antenna (4), in time slots 1 and 3, only spread pilot signal 04 for antenna 4 is transmitted. In time slot 2, spread pilot signal 04 for antenna 4 and spread information for mobile station (2) are composed to transmit.

Figure 9:
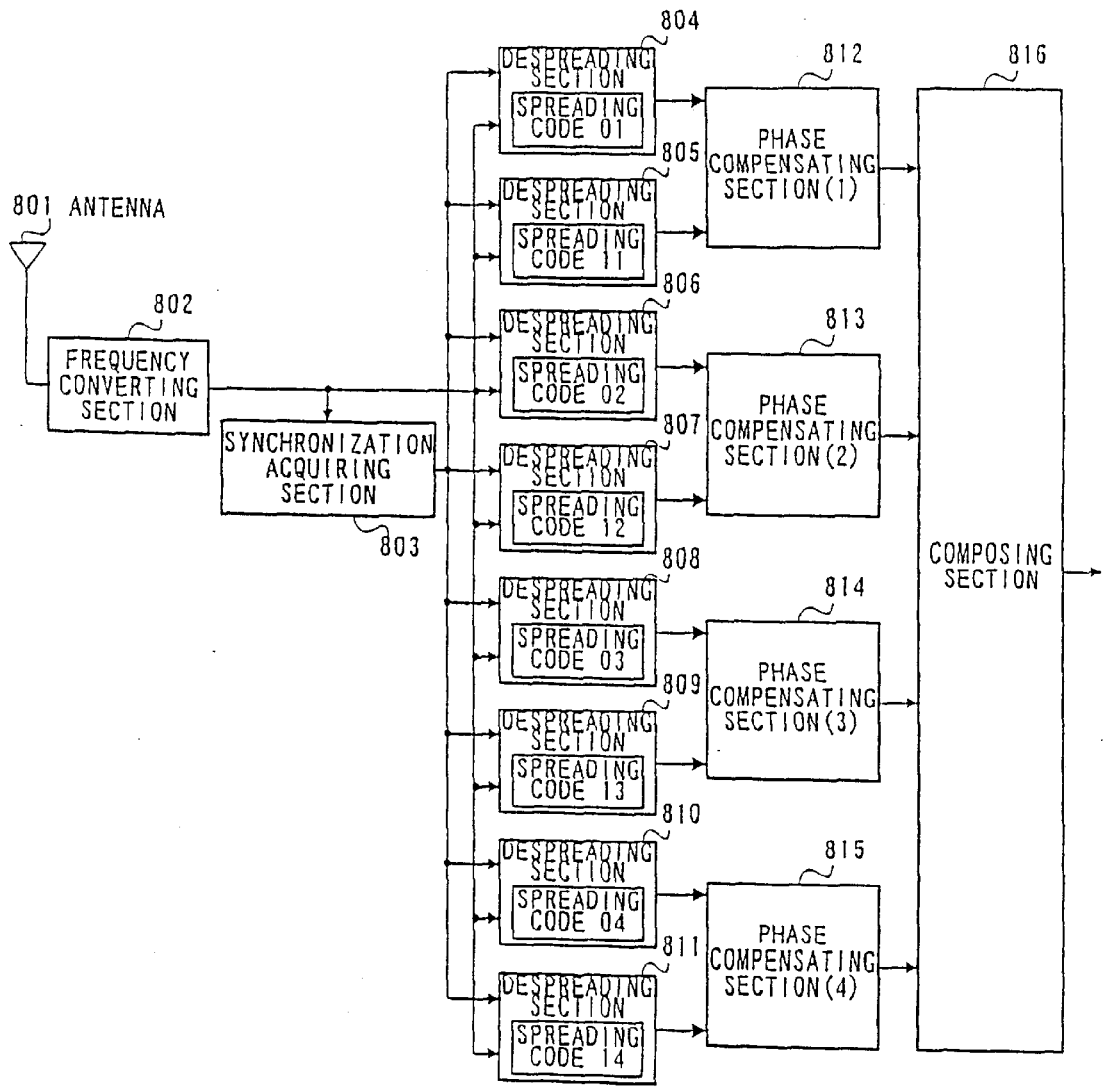
FIG. 9 is a block diagram illustrating configuration of a mobile station reception apparatus in the Embodiment 4 of the present invention.

The case is considered that the signals constituted as described above are transmitted from the base station transmission apparatus in the Embodiment 3 then received at the mobile station reception apparatus illustrated in FIG. 9. Signals received at antenna 801 are frequency converted at frequency converting section 802, and provided into synchronization acquiring section 403 and despreading sections 804 through 811. Despreading sections 804, 806, 808 and 810 despread pilot signals synchronized and spreading sections 805, 807, 809 and 811 despread information signals of mobile station (1) and (2). Signals despread at despreading sections 804 through 811 are provided into phase compensating sections 812 through 815, then phase compensated signals are provided into composing section 816 to compose.

Operations at the mobile station reception apparatus constituted as described above are explained. Radio signals are received at antenna 801 then transmitted into frequency converting section 802. Signals frequency converted from radio frequency are distributed to provide into synchronization acquiring section 803 and deapreading sections 804 through 811. Synchronization acquiring section 803 acquires the synchronization of spreading code. The acquisition is executed on the basis of correlation obtained by despreading reception signals. To despraed, it is allowed to use spreading code of pilot signal, spreading code of information signals or both of them. However, it is not certain whether spreading information signals may be transmitted from antenna (1) or not. In other words, the correlation of spreading code 11 is obtained clearly when transmitted from antenna 1, however it is buried in noise when not transmitted. Accordingly, it is better to use spreading codes 01, 02, 03 and 04 of pilot signals which are always transmitted to accurately acquire the synchronization.

Because signals transmitted from four antennas at a base station at the same time are received at almost same time, the timing acquired using spreading code 01 of pilot signal for antenna (1), the timing acquired using spreading code 02 of pilot signal for antenna (2), the timing acquired using spreading code 03 of pilot signal for antenna (3) and the timing acquired using spreading code 04 of pilot signal for antenna (4) are almost same. By using these four spreading codes, it is possible to reduce a time to acquire the timing, and to acquire the timing accurately.

Acquired timing is provided into spreading sections 804 through 811. Despreading section 804 despreads reception signals with spreading code 01 and assumes a phase shift amount of information signals transmitted from antenna (1) from a phase shift amount of pilot signal from antenna (1) to provide into phase compensating section 812. Despreading section 805 despreads reception signals with spreading code 11 and provides information signals transmitted from antenna (1) into phase compensating section 812. Phase compensating section 812 compensates the phase shift amount of information signals transmitted from antenna (1) to provide into composing section 816. Despreading section 806 despreads reception signals with spreading code 02 and assumes a phase shift amount of information signals transmitted from antenna (2) from a phase shift amount of pilot signal from antenna (2) to provide into phase compensating section 813. Despreading section 807 despreads reception signals with spreading code 12 and provides information signals transmitted from antenna (2) into phase compensating section 813. Phase compensating section 813 compensates the phase shift amount of information signals transmitted from antenna (2) to provide into composing section 816.

Despreading section 808 despreads reception signals with spreading code 03 and assumes a phase shift amount of information signals transmitted from antenna (3) from a phase shift amount of pilot signal from antenna (3) to provide into phase compensating section 814. Despreading section 809 despreads reception signals with spreading code 13 and provides information signals transmitted from antenna (3) into phase compensating section 814. Phase compensating section 814 compensates the phase shift amount of information signals transmitted from antenna (3) to provide into composing section 816. Despreading section 810 despreads reception signals with spreading code 04 and assumes a phase shift amount of information signals transmitted from antenna (4) from a phase shift amount of pilot signal from antenna (4) to provide into phase compensating section 815. Despreading section 811 despreads reception signals with spreading code 14 and provides information signals transmitted from antenna (4) into phase compensating section 815. Phase compensating section 815 compensates the phase shift amount of information signals transmitted from antenna (4) to provide into composing section 816. Composing section 816 composes signals despread then phase compensated to reproduce information signals.

According to it, information signals each transmitted from each of two antennas assumed under good condition in radio propagation can be both received at the same time. Because of it, in the case where one wrong antenna is selected at a base station because of error in assuming, signals transmitted from another antenna can be received. That permits communications in good condition.

And, in the case where the condition in radio propagation varies relatively fast compared with a period for antenna selection, the propagation condition for one transmission antenna may deteriorate, however the signals from another antenna can be received. That also permits communications in good condition.

And, by using a common pilot signal for each antenna, it is possible to increase the number of pilot symbols in a frame, which results in making the reliability in communications higher. It is also possible to decrease the ratio of pilot signal in total signals, which results in a increase of the ratio of information signals.

As described above, in the Embodiment 4, by despreading each of information signals, which are distributed, spreaded with each of a plurality of different spreading codes then transmitted from each of different antennas, with the spreading code is used to spread and composing them, high utilization efficiency of radio frequency having limitations is achieved with communication quality in radio lines improved and the number of mobile stations capable of communicating with one base station increased.

And, in the Embodiment described above, application for a mobile station is explained, however it is also applicable for a base station.

It is possible to properly combine the base station apparatus and the mobile station apparatus in the Embodiments described above to use in a radio communication system. And, in the Embodiments described above, the case of switching a composing section coupled to an antenna at switching section is explained, however it is also possible for switching section to switch an antenna. And, the Embodiments described above, the case where pilot symbols and information symbols are included in a time slot, however it is also possible to execute in the same way in the case where the time slot includes a transmission power control signal, for instance, TPC.

As described above, in the CDMA mobile communication apparatus of the present invention, by despreading each of information signals, which are distributed, spread with each of a plurality of different spreading codes then transmitted from each of different antennas, with the spreading code used to spread and composing them, the effect of high utilization efficiency of radio frequency having limitations is achieved with communication quality in radio lines improved and the number of mobile stations capable of communicating with one base station increased.

What is claimed is:

1. A CDMA communication apparatus comprising:
   a plurality of antennas;
   an antenna selector that, for each of a plurality of transmission signals, selects at least two antennas from said plurality of antennas, each of said two antennas having a good line condition;
   a spreading circuit that spreads one of the plurality of transmission signals according to a plurality of spreading codes;
   a switch configured to switch said spread one transmission signal to a first of said selected two antennas according to a first of said plurality of spreading codes, said switch further configured to switch said spread one transmission signal to a second of said selected two antennas according to a second of said plurality of spreading codes; and
   wherein said selected two antennas are each configured to independently and simultaneously transmit said spread one transmission signal according to each of said plurality of spreading codes.

2. The CDMA communication apparatus according to claim 1, wherein said antenna selector is configured to select the number of antennas under good line condition in accordance with a corresponding number of spreading codes.

3. The CDMA communication apparatus according to claim 1, wherein said spreading circuit spreads at least two of said plurality of transmission signals according to a plurality of spreading codes for each of said at least two of said plurality of transmission signals, the apparatus further comprising a composer for composing each of said at least two spread transmission signals when the same antenna is selected for a plurality of transmission signals.

4. The CDMA communication apparatus according to claim 3, further comprising a system that provides a spread signal from at least one of said at least two of said plurality of transmission signals to an antenna in accordance with an instruction at said selector.

5. A CDMA communication apparatus comprising:
   a plurality of antennas each having a composer for composing a signal;
   a spreading circuit that spreads each of a plurality of signals, each of said plurality of signals being spread according to a plurality of spreading codes;
   an antenna selector that, for each of said spread plurality of signals, selects at least two antennas having a good line condition, from said plurality of antennas; and
   a switch configured to switch a said spread signal to a first of said selected two antennas according to a first of said plurality of spreading codes, said switch further configured to switch said spread signal to a second of said selected two antennas according to a second of said plurality of spreading codes.

6. The CDMA communication apparatus according to claim 5, wherein said spread signal includes a pilot signal and information signals, said pilot signal being provided to said composer after being spread at the spreading circuit, without switching.

7. A base station having a CDMA communication apparatus, the CDMA communication apparatus comprising:
   an antenna selector that selects at least two antennas from a plurality of antennas, each of said two antennas having a good line condition;
   a spreading circuit that spreads a transmission signal according to a plurality of spreading codes;
   a switch configured to switch said spread transmission signal to a first of said selected two antennas according to a first of said plurality of spreading codes, said switch further configured to switch said spread transmission signal to a second of said selected two antennas according to a second of said plurality of spreading codes; and
   wherein said selected two antennas are each configured to independently and simultaneously transmit said spread transmission signal according to each of said plurality of spreading codes.

8. The base station according to claim 7, wherein said antenna selector is configured to select the number of antennas under good line condition in accordance with a corresponding number of spreading codes.

9. The base station according to claim 7, wherein said spreading circuit spreads at least two transmission signals according to a plurality of spreading codes for each of said at least two transmission signals, the apparatus further comprising a composer for composing each of said at least two spread transmission signals when the same antenna is selected for a plurality of transmission signals.

10. The base station according to claim 7, further comprising a system for providing a spread signal from at least one of said at least two of said plurality of transmission signals to an antenna in accordance with an instruction at said selector.

11. A mobile station communicating with a base station having a CDMA communication apparatus, the CDMA communication apparatus comprising:
   a plurality of antennas;
   an antenna selector that, for each of a plurality of transmission signals, selects at least two antennas from said plurality of antennas, each of said two antennas having a good line condition;
   a spreading circuit that spreads one of the plurality of transmission signals according to a plurality of spreading codes;
   a switch configured to switch said spread one transmission signal to a first of said selected two antennas according to a first of said plurality of spreading codes, said switch further configured to switch said spread one transmission signal to a second of said selected two antennas according to a second of said plurality of spreading codes; and
   wherein said selected two antennas are each configured to independently and simultaneously transmit said spread one transmission signal according to each of said plurality of spreading codes.

12. The mobile station according to claim 11, wherein said antenna selector selects the number of antennas under good line condition in accordance with a corresponding number of spreading codes.

13. The mobile station according to claim 11, wherein said spreading circuit spreads at least two of said plurality of transmission signals according to a plurality of spreading codes for each of said at least two of said plurality of transmission signals, the apparatus further comprising a composer for composing each of said at least two spread transmission signals when the same antenna is selected for a plurality of transmission signals.

14. The mobile station according to claim 13, wherein the CDMA communication apparatus further comprises a system that provides a spread signal from at least one of said at least two of said plurality of transmission signals to an antenna in accordance with an instruction at said selector.

15. A CDMA communication system comprising:
   a base station having a CDMA communication apparatus including:
      a plurality of antennas;
      an antenna selector that, for each of a plurality of transmission signals, selects at least two antennas from said plurality of antennas, each of said two antennas having a good line condition;
      a spreading circuit that spreads one of the plurality of transmission signals according to a plurality of spreading codes;
      a switch configured to switch said spread one transmission signal to a first of said selected two antennas according to a first of said plurality of spreading codes, said switch further configured to switch said spread one transmission signal to a second of said selected two antennas according to a second of said plurality of spreading codes; and
      wherein said selected two antennas are each configured to independently and simultaneously transmit said spread one transmission signal according to each of said plurality of spreading codes; and
   a mobile station communicating with said base station.

16. A CDMA communication method comprising:
   selecting at least two antennas having a good line condition from a plurality of antennas, for each of a plurality of transmission signals;
   spreading one of the plurality of transmission signals according to a plurality of spreading codes;
   switching the spread one transmission signal to a first of the selected two antennas according to a first of the plurality of spreading codes:
   switching the spread one transmission signal to a second of the selected two antennas according to a second of the plurality of spreading codes; and
   independently and simultaneously transmitting the spread one transmission signal according to each of the plurality of spreading codes.

17. The CDMA communication method according to claim 16, wherein said selecting further comprises selecting the number of antennas under good line condition in accordance with a corresponding number of spreading codes.

18. The CDMA communication method according to claim 16, wherein:
   said spreading further comprises spreading at least two of the plurality of transmission signals according to a plurality of spreading codes for each of the at least two of said plurality of transmission signals; and
   composing each of the at least two spread transmission signals when the same antenna is selected for a plurality of transmission signals.

19. The CDMA communication method according to claim 16, wherein said selecting further comprises selecting, an antenna having reception signals in which at least one of correlation and SIR is greater than that of other antennas.

20. The CDMA communication method according to claim 19, wherein the selected antennas under good condition are in radio propagation in a next slot and are detemined from previous information obtained by monitoring at least one of correlation and SIR.

21. The CDMA communication method according to claim 19, further comprising setting a transmission ratio of each antenna corresponding to a reception power ratio in the selected antenna.

22. A CDMA communications method comprising:
   spreading each of a plurality of transmission signals, each of said plurality of signals being spread according to a plurality of spreading codes;
   selecting at least two antennas having a good line condition from a plurality of antennas, for each of the spread plurality of signals;
   switching a spread transmission signal to a first of the selected two antennas according to a first of the plurality of spreading codes; and
   switching the spread one transmission signal to a second of the selected two antennas according to a second of the plurality of spreading codes.

23. The CDMA communication method according to claim 22, wherein the spread signal includes a pilot signal and information signals, said pilot signal being provided to said composer after being spread at the spreading circuit, without switching.

24. The CDMA communication method according to claim 22, further comprising determining a common pilot signal for each antenna.

25. The CDMA communication method according to claim 22, further comprising selecting, from a plurality of antennas, an antenna having reception signals in which at least one of correlation and SIR is bigger than that of the other antennas from the plurality of antennas.

26. The CDMA communication method according to claim 25, wherein the selected antennas under good condition are in radio propagation in a next slot and are determined from previous information obtained by monitoring at least one of correlation and SIR.

27. The CDMA communication method according to claim 22, further comprising setting a transmission ratio of each antenna corresponding with a reception power ratio in the selected antenna.

* * * * *